United States Patent
Vollmar

(10) Patent No.: US 6,584,393 B1
(45) Date of Patent: Jun. 24, 2003

(54) METHOD FOR CONTROLLING AN AUTOMATIC GEARBOX OF A MOTOR VEHICLE WHICH IS DRIVEN BY AN INTERNAL COMBUSTION ENGINE HAVING AN EXHAUST-GAS CATALYTIC CONVERTER

(75) Inventor: Reinhard Vollmar, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/890,755

(22) PCT Filed: Feb. 7, 2000

(86) PCT No.: PCT/EP00/00948

§ 371 (c)(1),
(2), (4) Date: Aug. 3, 2001

(87) PCT Pub. No.: WO00/47917

PCT Pub. Date: Aug. 17, 2000

(30) Foreign Application Priority Data

Feb. 11, 1999  (DE) .......................................... 199 05 576

(51) Int. Cl.$^7$ ................................................ G06F 7/00

(52) U.S. Cl. .......................................... 701/55; 701/52

(58) Field of Search .............................. 701/51, 55, 52; 477/34

(56) References Cited

U.S. PATENT DOCUMENTS 5,069,084 A   12/1991   Matsuno et al. ............... 74/844
5,131,293 A    7/1992   Kaiser et al. .................. 74/844

FOREIGN PATENT DOCUMENTS

| DE | 39 28 814 A1 | 3/1991 | ........... F16H/59/78 |
| DE | 40 29 811 A1 | 3/1992 | ........... F01N/3/38 |
| DE | 43 32 456 A1 | 3/1995 | ........... F16H/59/78 |
| DE | 41 14 033 C2 | 7/1997 | ........... F16H/59/78 |
| DE | 197 43 743 A1 | 4/1999 | ........... F16H/59/78 |
| DE | 197 42 313 A1 | 5/1999 | ........... F16H/59/78 |
| WO | 98/01659 | 1/1998 | ........... F02D/41/06 |
| WO | 99/15815 | 4/1999 | ........... F16H/59/72 |
| WO | 99/18371 | 4/1999 | ........... F16H/61/02 |

*Primary Examiner*—Yonel Beaulieu
(74) *Attorney, Agent, or Firm*—Davis & Bujold, P.L.L.C.

(57) ABSTRACT

Proposed is a method for the control of an automatic transmission of a motor vehicle driven by an internal combustion engine with an exhaust gas catalyst. For the purpose a more rapid warm-up of the catalyst, a warm-up shift program (E4) is input into an electronic transmission module, with characteristic curves for a gear change at higher motor speeds of rotation ($n_{mot}$) than have been input for the operating temperature of the catalyst, which method is initiated when, via a temperature sensor, a call for a warm-up phase of the internal combustion is signaled. The warm-up shift-program (F4) remains activated until a value ($WL_{PR}$), which is equivalent to the quantity of exhaust gas flowing through the catalyst, reaches that value predetermined as the threshold value ($WL_{PRE}$).

8 Claims, 1 Drawing Sheet

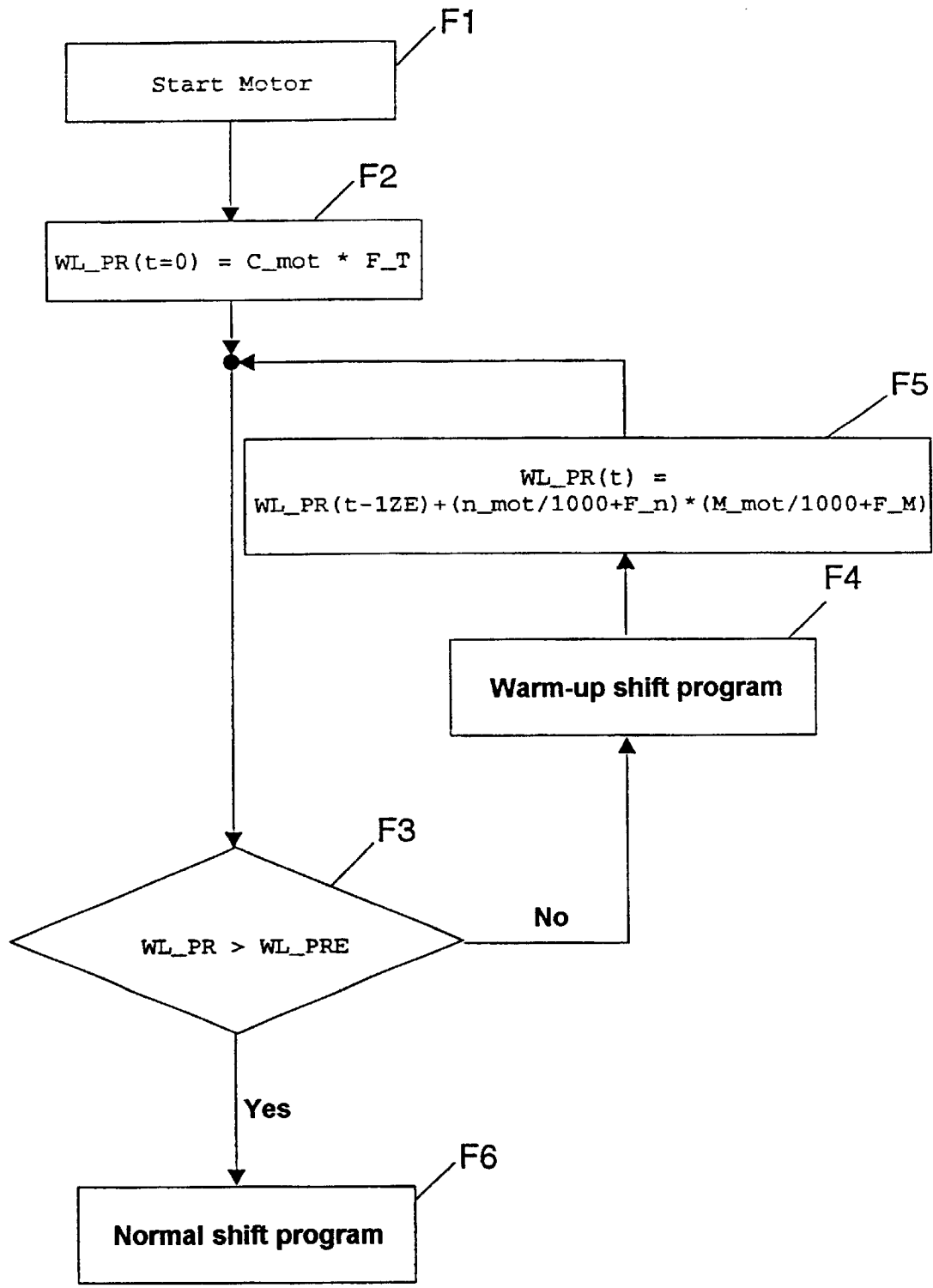

METHOD FOR CONTROLLING AN AUTOMATIC GEARBOX OF A MOTOR VEHICLE WHICH IS DRIVEN BY AN INTERNAL COMBUSTION ENGINE HAVING AN EXHAUST-GAS CATALYTIC CONVERTER

The invention concerns a method for the control of an automatic transmission of a motor vehicle driven by an internal combustion engine with an exhaust gas catalyst, wherein, for a more rapid warm-up of the catalyst, a warm-up gear shift program is provided, in accord with the generic concept more closely defined in claim 1.

For the minimizing of environmentally damaging emissions, modern motor vehicles possess an exhaust gas catalyst located following the internal combustion engine. Catalysts, installed in such a manner, only become fully active when heated to their operating temperature. In order to assure an optimal cleaning of the exhaust gases, the catalyst must he heated up as rapidly as possible after a cold start. The rapid start, where automatic transmissions are concerned, is supported by specified shift positions, which are related to progressively higher rotational speeds of the motor.

In this matter, warm-up programs have been made known within the practice, which are activated at higher RPM's, but wherein the duration of such programs has always presented problems. In case, for instance, a warm-up program is too short, then the exhaust gas catalyst does not attain its necessary operating temperature and the level of the contaminating materials emitted from the vehicle are higher than desired. If the warm-up program lasts too long, then the driving mode is unnecessarily carried out too long at a high fuel consumption and with limited driving comfort.

DE 39 28 814 C2 discloses a control apparatus for a self shifting transmission for a motor vehicle with an exhaust gas catalyst, wherein the shifting stages can be chosen by the driver for either manual operation or automatic, on at least an optimized driving-requirement and/or an optimized loading basis. If, by means of a temperature sensor, the conditions of a cold start of the motor vehicle are signaled, then, a warm-up program is activated for a specified time period, or as long as the cold start conditions remain in force. This so activated warm-up program permits only such driving conditions as are in accord with the higher preset exhaust gas quantities and energy flow as are specified in the optimized shift program.

This procedure leads to a quick attainment of the temperature required for a sufficient for satisfactory conversion rate of exhaust gas contaminating materials. However, the specification for a definite running time for the warm-up program neglects to take into consideration, that the catalyst warms more quickly or slower in proportion to the manner of driving.

In order to align the warm-up program more nearly in accord with the factual conditions, there is provided, besides the expiration of a predetermined time as a termination criterium for the warm up program, also the attainment of a specified temperature of the motor, of the transmission, or of the catalyst. Since, in practice, the warm-up periods of the motor, the transmission and the catalyst generally can be widely differing, this procedure as compared to the actual motor and/or transmission temperatures is subject to substantial errors.

Values most nearly approaching reality, can only be achieved by means of a proposed determination of the actual temperature of the catalyst. This requires, however, extensive, costly and sensitive instrumentation.

DE 41 14 033 C2 makes known another procedure for the control of the change of gear shift positions in a motor vehicle, wherein, during the warm-up phase of the motor, stored shift curves are modified in such a way, that the interchange of gears at higher speeds, that is, at higher RPM of the internal combustion engine, is carried out in accord with the warm-up phase.

The duration of the warm-up program depends, in this procedure, on a ratio between motor cooling water temperature, as determined by a temperature sensor, and a preset operational temperature, wherein the warm-up phase is assumed to be terminated, when the actual motor cooling water temperature has reached the temperature of its said preset operational temperature.

Since, also in this case, the unreliable temperature values of the motor cooling water can be brought forward as a criterium for terminating the warm-up program, once again, the real conditions are not sufficiently approximated.

The purpose of the present invention is to make available a method for the control of an automatic transmission of a motor vehicle which is driven by an internal combustion engine having an exhaust gas catalyst, with which a warm-up gear shift program to bring about a more rapid warm-up of the exhaust gas catalyst, wherein higher gear shifting points for gear changes remain activated, only for such a time, until the exhaust gas catalyst achieves it optimal operational temperature. In this way, at the earliest possible moment, a return to more quiet and fuel saving gear ratio can be made.

In accord with the invention, this purpose is achieved with a method in accord with the characterizing features of claim 1.

The logic of the method in accord with the invention, has a starting point, wherein it is signaled, that the exhaust gas catalyst is warmed, depending on the exhaust gas quantity which flows through it, wherein said exhaust gas quantity is a function of the speed of rotation of the motor and the motor torque.

The exhaust gas quantities can be very simply determined empirically and reliably for all possible conditions of operation, and stored in a computer of the electronic transmission control apparatus. Since the measured value of the temperature of the motor, upon the start of the internal combustion engine, under the best conditions, agrees with the temperature of the exhaust gas catalyst, the invented method is provided in an advantageous way with reliable data, which data, in a predominate manner, reflect the actual conditions. Thereby the invented method makes possible, that the exhaust gas catalyst is more quickly warmed up to its normal operating temperature, whereby a desirable lessening of the contaminant emission is achieved.

Additionally, however, the duration of the warm-up shift program is so determined, that the RPM increasing action of the warm-up program is held to the least possible time. By this means, early in a shift program, the shift can be carried out at lower gear ratios, which action makes possible a desirable driving mode with low fuel consumption.

Further advantages and developments of the invention arise from the subordinate claims and from the following description of an embodiment aided by the drawing.

This single drawing shows a simplified flow-diagram of a method in accord with the invention.

The method depicted on the drawing encompasses the control of a automatic transmission, not further described here, for a motor vehicle driven by an internal combustion engine with an exhaust gas catalyst. The method is carried out with an electronic transmission control module (TCM), which continually exchanges signals with a digital engine electronic (DEE) system of the internal combustion engine, this exchange being communicated through a Controller Area Network, (i.e. CAN).

A warm-up shift program F4 with characteristic gear change curves for a shift to higher RPM's, $n_{mot}$, as at the operational temperature of the exhaust gas catalyst, has been input to a microprocessor of the electronic transmission control module, for the purpose of a more rapid warm-up of the exhaust gas catalyst, following a recognized start in the first Function F1 of the internal combustion engine i.e. of the motor.

Before the warm-up shift program F4 is started, first, in a Function F2, a counter value $WL_{PR}$, which value is dependent upon a temperature $C_{mot}$, which, in a successive verification function F3 is compared with a specified threshold $WL_{PRE}$.

The counter value $WL_{PR}$, which is dependent upon the motor temperature $C_{mot}$, presents at this point, a value which is equivalent to the quantity of exhaust gas which is flowing through one of the exhaust gas catalysts.

Upon the start of the internal combustion engine, in the function F2, a start-value of the counter enumeration $WL_{PR}$ is selected from such a value, taken from a (not further described) characteristic curve in the memory of the electronic transmission module, whereby the beginning counter value $WL_{PR}$ of the characteristic curve, by means of the motor temperature $C_{mot}$, which is determined by temperature sensors in, respectively, the motor cooling water and the ambient atmosphere, and a Motor Factor $F_T$ which has been empirically determined in accord with the equation:

$$WL_{PR}(t=0) = C_{mot} \cdot FT$$

In the following Function F3, a verification is carried out, as to whether of not, this start-value $WL_{PR}$ is greater or less than the threshold value $WL_{PRE}$, which makes available an applicable value, which corresponds to the quantity of exhaust gas, which the exhaust gas catalyst must possess as throughflow to achieve its operational temperature.

If, in a random access memory (RAM) cell, the start-value input by the electronic transmission module $WL_{PR}$ (t=0), or a later counter value $WL_{PR}$ is less than the Warm-up Program End-Value $WL_{PRE}$, then the warm-up shift program in the Function F4 is activated, otherwise, the program progress is branched in a Function F6 to a normal shift program.

An alternative to this programming, is that the start-value $WL_{PR}$ (t=0) is variable, and the end value $WL_{PRE}$ is constant. In this case, it can be provided, that at the start of the internal combustion engine, the value of $WL_{PR}$ (t=0) is set at zero and the termination criterion, presented by the threshold value $WL_{PRE}$ is determined in dependency of the beginning motor temperature $C_{mot}$.

The warm-up shift program F4 remains, in any case, active until the counter value $WL_{PR}$ reaches the predetermined threshold value $WL_{PRE}$ for the operating temperature of the exhaust gas catalyst.

In this operation, the counter value $WL_{PR}$ refreshed in a Function F5 in time units ZE of one second, for which only a small computer capacity is needed.

The actual counter value $WL_{PR}$ is determined from the rotational speed of the motor, i.e. $n_{mot}$ and a motor torque $m_{mot}$ by the following equation:

$$WL_{PR(t)} = WL_{PR}(t-1ZE) + \left(\frac{n_{mot}}{1000} + F_N\right) \cdot \left(\frac{M_{mot}}{1000} + F_M\right)$$

Wherein: $WL_{PR(t)}$ is the exhaust gas as input by the actual counter value, $WL_{PR}(t-1ZE)$ is the old, previously computed counter value in ZE units, $n_{mot}$ is the motor RPM, $F_n$ is a correction factor for RPM, $M_{mot}$ is the motor torque, and $F_M$ is a correction factor for the motor torque.

The correction value of the speed of rotation for the motor $F_n$ and the correction factor for the motor torque $F_M$ are empirically determined, and these values are stored in a non-volatile memory of the electronic transmission control module. These arise out of the warm-up of the exhaust gas catalyst at specified rotary speeds of the motor $n_{mot}$ and motor torques $M_{mot}$ under different operational conditions.

Upon sufficient testing of the warm-up of the exhaust catalyst in dependency with the exhaust gas quantity, it is possible to optimize the presented process for all possible operational situations.

Reference Numbers

| | |
|---|---|
| $C_{mot}$ | Motor temperature |
| $F_M$ | Correction factor for motor torque |
| $F_n$ | Correction factor for motor RPM |
| $F_T$ | Motor factor related to time |
| $M_{mot}$ | Motor torque |
| $n_{mot}$ | Motor RPM |
| t | Time |
| $WL_{PR}$ | Counter value |
| $WL_{PRE}$ | Counter value, final value |
| ZE | Time unit |

What is claimed is:

1. A method for controlling an automatic transmission of a motor vehicle driven by an internal combustion engine with an exhaust gas catalyst, the method having a warm-up shifting program with a plurality of characteristic curves for gear changes at higher rotational speeds of the motor, than would be the case at an operational temperature of the exhaust gas catalyst, is input into an electronic transmission control module for the more rapid warm-up of the exhaust gas catalyst, the method comprises the steps of:

calculating a beginning counter value ($WL_{PR}(t=0)$);

comparing the beginning counter value or a characteristic value ($WL_{PR}$); with a predefined threshold value ($WL_{PRE}$);

initiating a warm-up shifting program when the beginning counter value ($WL_{PR}(t=0)$) is less than or equal to the predefined threshold value;

maintaining the warm-up shifting program until the characteristic value ($WL_{PR}$) is greater than the predefined threshold value ($WL_{PRE}$); and terminating the warm-up shifting program when the characteristic value ($WL_{PR}$) is greater than the predefined threshold value ($WL_{PRE}$).

2. The method according to claim 1, further comprising the step of calculating the characteristic value, ($WL_{PR}$) from a rotational speed of the motor ($n_{mot}$) and a motor torque ($M_{mot}$), with consideration given to an empirically determined correction factor value for the rotational speed of the motor ($F_n$) and an empirically determined correction factor value for the motor torque ($F_M$).

3. The method according to claim 2, further comprising the step of storing the correction factor value for the rotational speed of the motor ($F_n$) and the correction factor value for the motor torque ($F_M$) in a non-volatile storage memory of the electronic transmission control module.

4. The method according to claim 1, further comprising the step of calculating the characteristic value ($WL_{PR}$), which is the equivalent of the exhaust gas through-flow, by the following equation:

$$WL_{PR(t)} = WL_{PR}(t - 1ZE) + \left(\frac{n_{mot}}{1000} + F_N\right) \cdot \left(\frac{M_{mot}}{1000} + F_M\right)$$

wherein $WL_{PR(t)}$ is the exhaust gas as input by the actual counter value, $WL_{PR}(t-1ZE)$ is the old, previously computed counter value in ZE units, $n_{mot}$ is the motor RPM, $F_n$ is a correction factor for RPM, $M_{mot}$ is the motor torque, and $F_M$ is a correction factor for the motor torque.

5. The method according to claim 1, further comprising the step of using a measured motor temperature ($C_{mot}$) at the starting of the internal combustion engine as the beginning counter value ($WL_{PR}(t=0)$).

6. The method according to claim 1, further comprising the step of using a value stored in a characteristic curve, and derived from the motor temperature ($C_{mot}$) and an empirically determined motor factor ($F_T$) in accord with the equation:

$$WL_{PR}(t=0) = C_{mot} \cdot F_T$$

as the beginning counter value ($WL_{PR}(t=0)$).

7. The method according to claim 1, further comprising the step of, upon the start of the internal combustion engine, setting the beginning counter value ($WL_{PR}(t=0)$), which is equivalent to the quantity of exhaust gas flowing through the catalyst, to zero, and choosing the predefined threshold value ($WL_{PRE}$) dependent upon the motor temperature ($C_{mot}$).

8. The method according to claim 4, further comprising the step of refreshing, in time units (ZE) of one second, the characteristic value ($WL_{PR}$) equal to the quantity of exhaust gas flowing through the catalyst.

* * * * *